(No Model.) 2 Sheets—Sheet 1.
J. A. TITZEL.
PROCESS OF SATURATING ARTICLES OR SUBSTANCES.
No. 486,744. Patented Nov. 22, 1892.
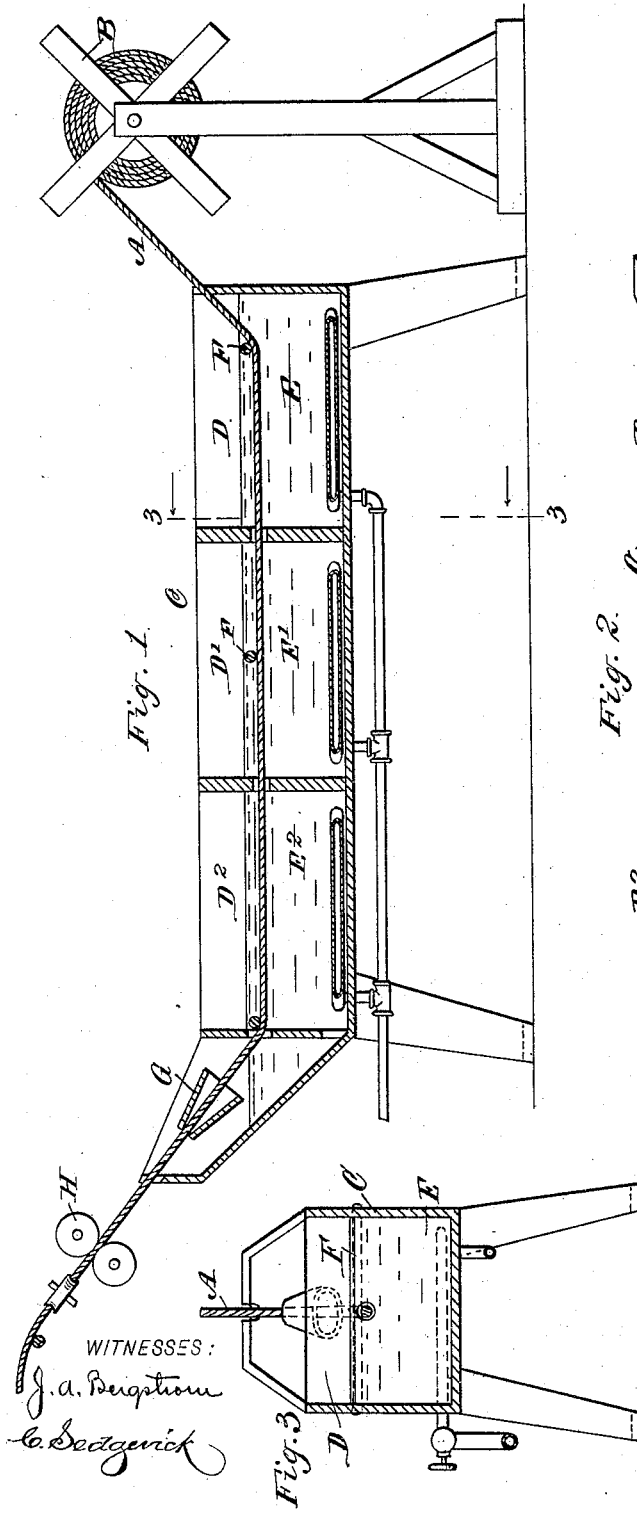
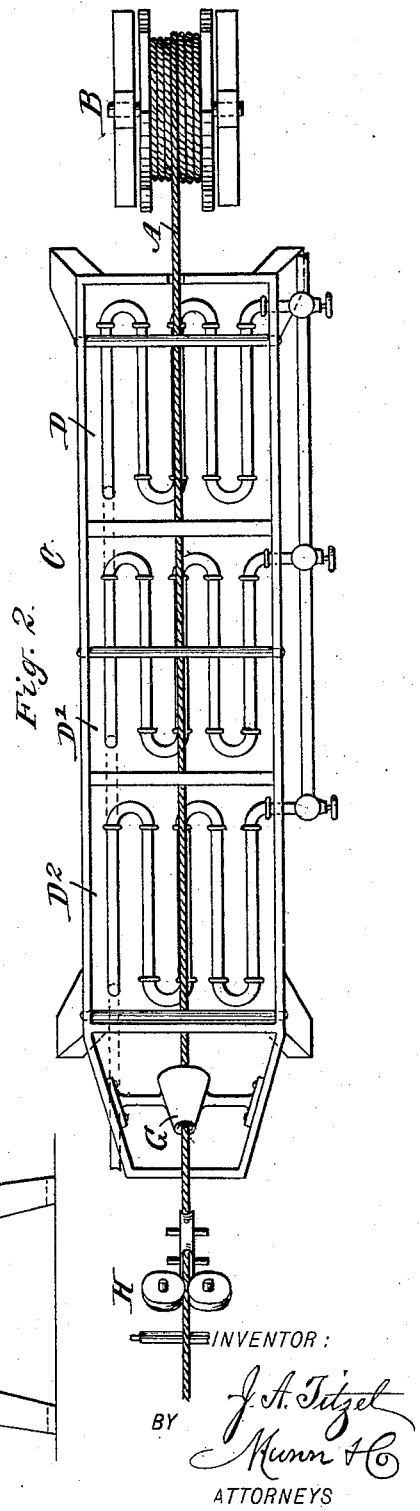
WITNESSES:
J. A. Bergstrom
C. Sedgwick
INVENTOR:
J. A. Titzel
BY Munn & Co.
ATTORNEYS
THE NORRIS PETERS CO., PHOTO-LITHO., WASHINGTON, D. C.

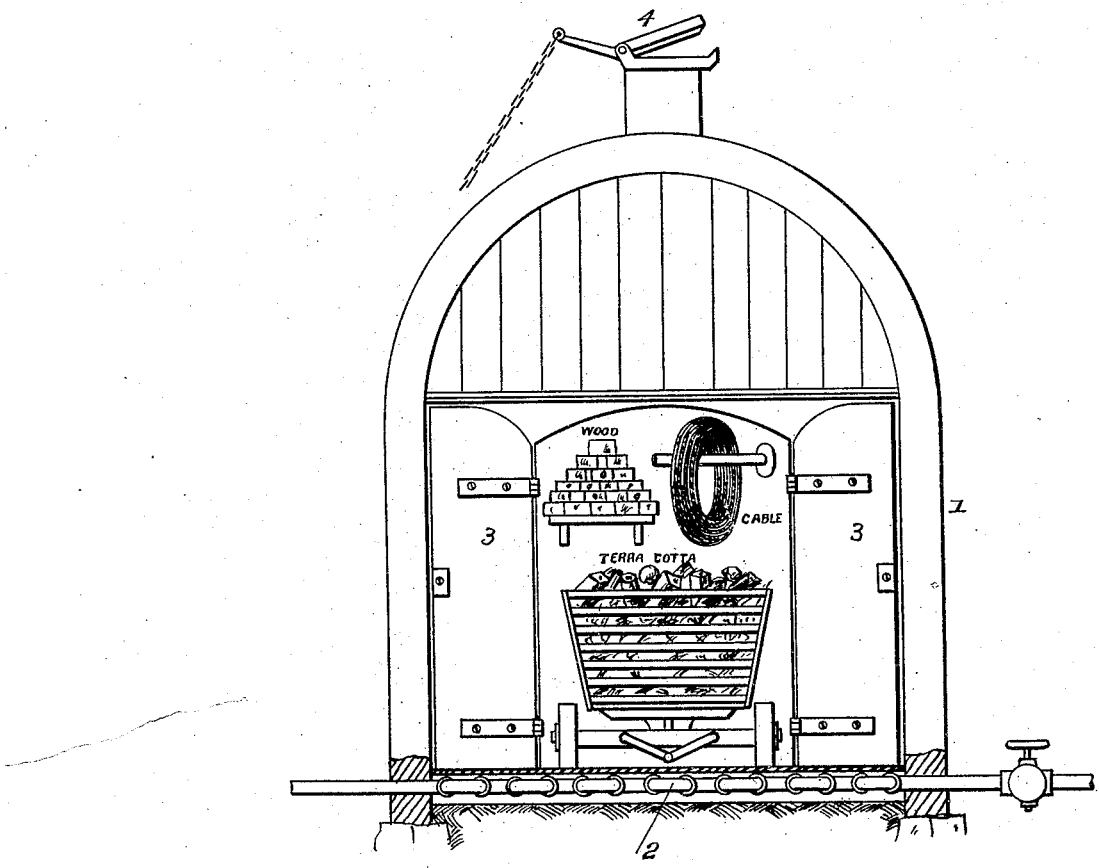

UNITED STATES PATENT OFFICE.

JOHN A. TITZEL, OF GLENSHAW, PENNSYLVANIA.

PROCESS OF SATURATING ARTICLES OR SUBSTANCES.

SPECIFICATION forming part of Letters Patent No. 486,744, dated November 22, 1892.

Application filed December 18, 1891. Serial No. 415,521. (No specimens.)

*To all whom it may concern:*

Be it known that I, JOHN A. TITZEL, of Glenshaw, in the county of Allegheny and State of Pennsylvania, have invented a new and Improved Process of Saturating Articles or Substances, of which the following is a full, clear, and exact description.

The object of the invention is to provide a new and improved process of coating and saturating various articles or substances—such as cables, hard and soft wood, terra-cotta, fibers, &c.—to completely insulate the same for electrical and other purposes or to render them air and water proof to increase their valuable properties and prevent decaying.

The improved process consists in first subjecting the article or substance to the action of heat to expand the air and other fluids contained in the pores of the article or substance, and then subjecting the article or substance to an immersion in a coating or saturating liquid heated to a less temperature, so as to cool the expanded air or fluid, and thereby form a vacuum in the pores, which latter are then rapidly filled by the liquid in which the article is immersed.

In order to carry this process into effect, I prefer to use an apparatus such as shown in the accompanying drawings, in which similar letters and numerals of reference indicate corresponding parts in all the figures.

Figure 1 is a sectional side elevation of the apparatus, showing the coating or saturating of a cable. Fig. 2 is a plan view of the same, and Fig. 3 is a transverse section of the same on the line 3 3 of Fig. 1. Fig. 4 is a side elevation of an oven, the doors being open to expose the various articles being dried therein.

The cable A is unwound from a spool B and is passed through a tank C, formed with several compartments D D′ D², each containing the coating or saturating liquid E, E′, or E², respectively, heated by steam-coils or other suitable means to temperatures varying in degree, the fluid E in the first compartment having the highest degree, the fluid E′ in the next compartment being somewhat less, and the third liquid being still more reduced in temperature. For preparing cables, wires, and other conductors of electricity the liquid is preferably in the form of a compound of wax heated to a liquid state. For cables, for instance, the temperature of the saturating liquid in the compartment D is about 300° to 350° Fahrenheit, that in the compartment D′ 225° to 250°, and that in the compartment D² about 212°.

In order to hold the cable immersed in the liquids, it is caused to pass under the rollers or rods F, held in the said compartments below the level of the liquid, as is plainly shown in Fig. 1, the cable at the end of the tank C passing through a die G to finally pass between pressure-rollers H for pressing the cable in the proper shape and removing surplus coating material.

It will be seen that when the cable passes through the liquid E it is heated to such an extent that the air or fluids contained in the pores, crevices, and other recesses or apertures expands under the exclusion of air, and when the cable passes through the second liquid E′, having a less degree of temperature, then a vacuum is formed by cooling of the fluid or air contained in the pores or crevices. The liquid E′, surrounding the cable, forces its way into the pores, crevices, and the like, owing to the vacuum therein, so that a complete coating and saturation takes place. When the cable passes through the liquid E² in the third compartment, a still further vacuum is formed in some of the crevices, pores, and the like, so that a further saturation or coating of the article takes place.

It is understood that any moisture which may be in the article or substance immersed in the liquids and coated and saturated as described is expelled by the heating process, and the air in the pores is rarefied and the highest degree is obtained in the first compartment D.

Instead of using a wax compound in the compartments D, D′, and D² other substances—such as quick-drying but non-volatile paint—can also be employed.

Instead of heating the article first in the compartment D it may be uniformly heated in an especially-constructed oven (see Fig. 4) and then passed through the substance in the several compartments in the manner above described. The oven 1 is heated by a steam-coil 2 or otherwise and has suitable doors 3 3 and a ventilating-damper 4.

I desire it understood that when the article is subjected to the preliminary heating in the oven that it will be immersed in the contents of all three compartments and that the oven will be heated to about 300° or 400° Fahrenheit, according to the temperature of the liquid in the compartment D. The oven and the tank C will of course be situated close to one another, so that the article will suffer no appreciable loss of heat in its passage from the oven to the compartment D. There must always be a marked difference between the temperature of the oven and that of the liquid in D and between the liquid in the several compartments.

It is understood that by forming a vacuum in the article immersed the liquid is rapidly absorbed and relieves the vacuum by filling the pores.

It will of course be understood that when articles other than the cable are being treated they will be lifted from one compartment to the other and not be passed through the apertures in the partitions and the liquid in the several compartments will not be permitted to intermingle, as a matter of course. In practice the apertures are of such a size as to be filled by the cable, so as to prevent the contents of the compartments from intermingling, the said apertures being exaggerated in the drawings for sake of clearness.

Having thus described my invention, I claim as new and desire to secure by Letters Patent—

1. The herein-described process of saturating articles or substances, consisting of first subjecting the article or substance to the action of heat to expand air and other fluids contained in the pores of the article or substance and then subjecting the article to an immersion in the coating or saturating liquid heated to a less temperature, so as to cool the air or fluid to form a vacuum in the pores filled by the surrounding coating or saturating liquid, substantially as shown and described.

2. In the process of saturating articles or substances, the steps consisting in immersing the article in a coating or saturating liquid heated to a high temperature and continuing the immersion in another portion of the liquid heated to a markedly-lower temperature, substantially as set forth.

3. In the process of saturating articles or substances, the steps consisting in subjecting the article or substance a series of times to the action of a saturating liquid which is each time of markedly-decreased temperature.

JOHN A. TITZEL.

Witnesses:
T. J. BOECKLEN,
JAS. C. TITZEL.